No. 747,669. PATENTED DEC. 22, 1903.
A. G. L. WENNER.
NUT LOCK.
APPLICATION FILED MAY 11, 1903.
NO MODEL.
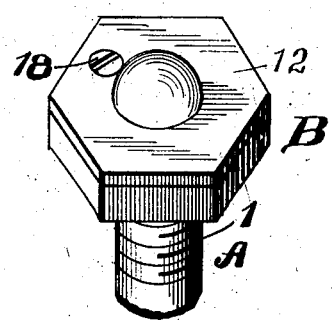
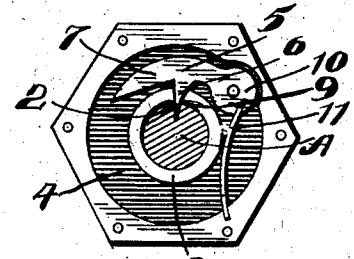
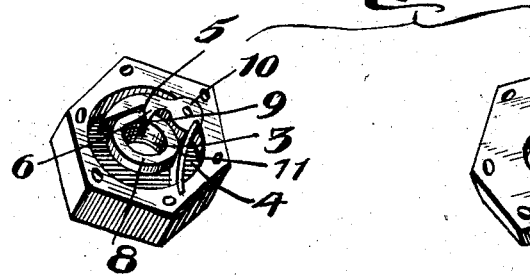
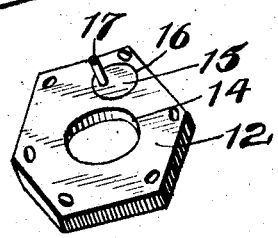
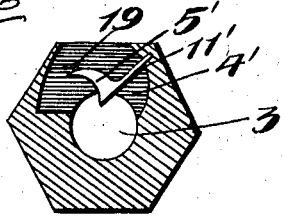
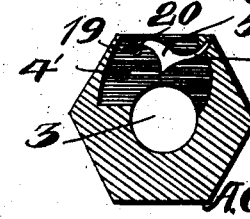
Inventor
A. G. L. Wenner.
By H. D. Willson
Attorney
Witnesses No. 747,669. Patented December 22, 1903.

UNITED STATES PATENT OFFICE.

ANDERS GUSTAF LAMBERT WENNER, OF ROSEAU, MINNESOTA.

NUT-LOCK.

SPECIFICATION forming part of Letters Patent No. 747,669, dated December 22, 1903.

Application filed May 11, 1903. Serial No. 156,636. (No model.)

*To all whom it may concern:*

Be it known that I, ANDERS GUSTAF LAMBERT WENNER, a citizen of the United States, residing at Roseau, in the county of Roseau and State of Minnesota, have invented certain new and useful Improvements in Nut-Locks; and I do declare the following to be a full, clear, and exact description of the invention, such as will enable others skilled in the art to which it appertains to make and use the same.

This invention relates to means for holding a part from retrograde movement or rotation on another part, and is designed particularly as a nut-lock by means of which a nut when applied to a bolt may be locked securely against movement.

The object of the invention is to provide locking mechanism which is simple of construction and effective for the intended purpose and which is applicable for use wherever it is desired to lock a part against movement or with relation to another part.

With this and other objects in view the invention consists in certain novel features of construction, combination, and arrangement of parts, as will be hereinafter more fully described, and particularly pointed out in the appended claims, reference being had to the accompanying drawings, in which—

Figure 1 is a perspective view showing the application of my invention as a nut-lock. Fig. 2 is a cross-section through the bolt, showing the nut with cover-plate removed. Fig. 3 is a rear perspective view of the nut and an inner perspective view of its cover-plate, showing them separated and disposed in proper relation for connection. Fig. 4 is a detail view of the key; and Figs. 5 and 6 are sectional views through the nut, showing a modification in the construction of the locking means.

My improved locking mechanism embodies two main parts—a bolt A, the threaded portion 1 of which is provided with a keeper groove or recess 2, which may be disposed radially or tangentially, and a nut B, which is provided with a threaded opening 3, by which it may be applied to the said threaded shank 1 of the bolt.

The nut B is hollowed out upon its outer side to form a chamber 4, in which is arranged the locking pawl or dog 5, provided with a locking spur or projection 6 and a tumbler or retracting-arm 7. As shown, the said pawl 5 is of segmental form and lies substantially concentric with an annular wall 8, through which the threaded opening 3 in the nut extends, and this spur or projection 6 is adapted to project through an opening 9 in said wall 8 and to seat within the groove or recess 2 in the bolt to lock the nut against rotation. At one end the dog or pawl has a rounded portion 10, which is fitted to turn or rotate between the outer wall of the chamber 4 and the annular wall 8, and said rounded portion is slotted to receive one end of a spring 11, the opposite end of which is fixed in a wall of the chamber. By this construction it will be observed that the outward movement of the arm 7 to retract the locking-spur 6 is resisted by the spring 11, which serves to act upon the rounded portion 10 of the pawl, so as to normally hold said spur 6 projected into the recess 9 so as to enter the recess 2 in the bolt.

The chamber 4 is closed by a cover-plate 12, which is secured to the nut by rivets 13 or other suitable fastenings and which is provided with an opening 14, coinciding with the opening 3, for the passage of the shank of the bolt.

In order to enable the arm 7 of the pawl 5 to be acted upon to retract said pawl, and thus withdraw the locking projection 6 out of engagement with the bolt, I provide a key comprising a disk 15, mounted to turn or rotate in a socket or recess 16 in the under side of the cover-plate 12. Projecting from the under side of this disk is a pin 17, which is eccentrically arranged and is adapted to engage the arm 7 of the pawl, and projecting from the upper side of the said disk is a head 18, which is notched for the reception of a suitable form of tool, by means of which the disk 17 may be turned to force the locking-pawl out of engagement with the bolt and hold it retracted, so as to enable the nut to be screwed farther on or off the bolt. The key may be otherwise constructed, however, or any other suitable means for operating it may be employed.

As a result of the construction above described it will be seen that the locking mechanism may be inclosed and protected from injury and from interference by dust, dirt, and other foreign substances and is adapted to lock the nut securely against retrograde rotation. When it is desired to release the nut, all that is necessary to do is to simply turn the key 15, whereupon the pawl will be moved out of locking engagement and allow the nut to freely turn. By the eccentric disposition of the retracting-pin 17 it will be clear that when the disk is turned a certain distance the pin will pass beyond the center and automatically lock the pawl 5 in retracted position against the tension of the spring 11. The lock as thus constructed is very efficient in use and may be employed for locking doors, trunks, windows, and connecting various parts which require locking together or holding against relative movement. In Figs. 5 and 6 the construction is modified by mounting the pawl 5' in a recess 4' in one side of the nut, which recess intersects the opening 3', and providing said pawl with a spring-arm 11', which is fitted at its outer end in a notch at one of the corners of the nut. The tendency of the spring 11' is to project the locking-lug of the pawl into the opening 3, and it may be held in such position against outward movement by means of a pin 19, removably fitted in an opening 20 in the nut. This pin bears upon the upper edge of the arm 7 in such position, and if it be desired to hold the bolt retracted a reversal of such position is effected by withdrawing the pin, swinging the arm 7 outwardly, and then replacing the pin so as to bear against the under side of said arm, whereupon it will hold the arm against inward movement, and thus keep the pawl retracted to enable the nut to be screwed on or off.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a locking device, the combination with a threaded member provided with a keeper, of a coöperating threaded member mounted thereon and having a chamber formed therein, a pawl in said chamber pivoted at one end, provided with a central projection to engage said keeper and having at its opposite end a retracting-arm, a spring for projecting the pawl, a cover to close said chamber, and a key for retracting the pawl, said key being permanently carried by the cover and comprising a rotary disk having an eccentric-pin projecting into said chamber to engage the said retracting-arm of the pawl, substantially as described.

In testimony whereof I have hereunto set my hand in presence of two subscribing witnesses.

ANDERS GUSTAF LAMBERT WENNER.

Witnesses:
IVER TORFIN,
JACOB WURSCHMIDT.